(12) United States Patent
Chung et al.

(10) Patent No.: US 8,225,291 B2
(45) Date of Patent: Jul. 17, 2012

(54) AUTOMATED DETECTION OF APPLICATION PERFORMANCE BOTTLENECKS

(75) Inventors: I-Hsin Chung, Yorktown Heights, NY (US); Guojing Cong, Ossining, NY (US); David Joseph Klepacki, New Paltz, NY (US); Simone Sbaraglia, Miami, FL (US); Seetharami R. Seelam, Ossining, NY (US); Hui-Fang Wen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1231 days.

(21) Appl. No.: 11/969,331

(22) Filed: Jan. 4, 2008

(65) Prior Publication Data
US 2009/0177642 A1    Jul. 9, 2009

(51) Int. Cl.
*G06F 9/44* (2006.01)
*G06F 11/00* (2006.01)
(52) U.S. Cl. ........ 717/125; 717/124; 717/127; 717/131; 714/38.1; 714/46; 714/57
(58) Field of Classification Search .................. None
See application file for complete search history.

(56) References Cited

U.S. PATENT DOCUMENTS 6,199,199 B1 * 3/2001 Johnston et al. ............. 717/107
6,970,805 B1   11/2005 Bierma et al.
2002/0013937 A1 * 1/2002 Ostanevich et al. ......... 717/9
2003/0061324 A1   3/2003 Atherton et al.
2005/0262386 A1   11/2005 Numanoi
2008/0114806 A1 * 5/2008 Kosche ...................... 707/104.1

OTHER PUBLICATIONS

Barton P. Miller Mark D. Callaghan Jonathan M. Cargille Jeffrey K. Hollingsworth R. Bruce Irvin Karen L. Karavanic Krishna Kunchithapadam Tia Newhall, The ParaDyn Parallel Performance Measurement Tool, 1995, IEEE, 0018-9162/95, p. 37-46.*
James Kohn Winifred Williams, ATExpert, 1993, Academic Press, 0743-7315/93, pp. 205-222.*
Roland Wimuller, Marian Bubak, Wlodzimierz Funika, Tomasz Arodz Marcin Kurdziel, Support for User-Defined Metrics in the Online Performance Analysis Tool G-PM, 2004, Institute of computer science.*
V. Sarkar, Automatic partitioniong of a program dependence graph into parallel tasks, IBM, vol. 35, No. 5/6, Sep./Nov. 1991.*
Joseph W. H. Liu, A graph Partitioning algorithm by Node seperators, ACM, vol. 15, No. 3, Sep. 1989, pp. 198-219.*

* cited by examiner

*Primary Examiner* — Lewis A Bullock, Jr.
*Assistant Examiner* — Hau H Hoang
(74) *Attorney, Agent, or Firm* — Yee & Associates, P.C.; Anne Dougherty

(57) ABSTRACT

Detecting performance bottlenecks in a target application is provided. In response to receiving hotspot selections from a user interface, bottleneck rules are extracted from a database. A hotspot is a region of source code that exceeds a time threshold to execute in the target application. Metrics needed to evaluate the bottleneck rules extracted from the database are identified. The identified metrics are computed. It is determined whether each bottleneck rule extracted from the database is evaluated to true using the computed metrics for hotspots in the target application. In response to determining that a bottleneck rule is evaluated to true using an appropriate computed metric corresponding to the bottleneck rule, a bottleneck description is created for the bottleneck rule. Then, the bottleneck description is sent to the user interface.

18 Claims, 7 Drawing Sheets

FIG. 5

500 BDE DATABASE

502 BOTTLENECK DEFINITION TABLE

| BOTTLENECK NAME | DIMENSIONS | DESCRIPTION | RULE | IMPROVEMENT | RESERVED |
|---|---|---|---|---|---|
| ... | ... | ... | ... | ... | ... |
| UNROLL-OP | CPU | LOOP UNROLLING SHOULD BE CONSIDERED | UNROLLIMPROVEMENT>0 | UNROLLIMPROVEMENT | |

504 PERFORMANCE METRICS TABLE

| METRIC NAME | MODULE NAME | METRIC PARAMETER LIST | DESCRIPTION |
|---|---|---|---|
| ... | ... | ... | ... |
| PM_CYCLE | Hpm_pwr5 | NONE | PROCESSOR CYCLES |

506 MODULES TABLE

| MODULE NAME | MODULE LOCATION | MODULE EXECUTION MODE | DESCRIPTION |
|---|---|---|---|
| ... | ... | ... | ... |
| Hpm_pwr5 | /usr/bin/Hpm_pwr5 | EXCLUSIVE | HARDWARE PERFORMANCE MONITOR MODULE, IN EXCLUSIVE MODE |

508 APPLICATION EXECUTION METRICS TABLE

| RUN-NUMBER | APPLICATION | CONFIGURATION | HOTSPOT | METRIC | VALUE |
|---|---|---|---|---|---|
| ... | ... | ... | ... | ... | ... |
| 1000 | LS-DYNA | POWER 5 + SMT | COMPUTE | PM_CYCLE | 1000 |

AUTOMATED DETECTION OF APPLICATION PERFORMANCE BOTTLENECKS

This invention was made with United States Government support under Contract No. HR0011-07-9-0002 awarded by Defense Advanced Research Projects Agency (DARPA). The Government has certain rights in the invention.

BACKGROUND OF THE INVENTION

1. Field of the Invention

The present invention relates generally to an improved data processing system. More specifically, the present invention is directed to a computer implemented method, system, and computer usable program code for an extensible infrastructure to automate detection of bottlenecks in application performance.

2. Description of the Related Art

To bridge the productivity gap between hardware complexity and software limitations of current and next-generation high performance computing systems, performance tools should allow users at any level of experience to conduct performance analysis and tune scientific applications. Traditional performance tools, however, offer little support for the non-expert user. Thus, non-expert users must seek the assistance of performance tuning experts to improve application performance on their systems. While these tuning experts may improve application performance and help a few non-expert users, the number of such experts is very limited. Consequently, many non-expert users do not have access to these experts.

Furthermore, traditional performance tools fail to ease the task of resolving application performance issues for the tuning experts, as well as the non-experts. These traditional performance tools do not support encoding of solved problems (i.e., problems that were previously identified and solved by a user). As a result, these traditional performance tools cannot detect and solve previously identified and solved problems in other applications.

Without the support of effective performance tools, users of these high performance computing systems will see this productivity gap continue to grow. Performance tools need to simplify the complexity of performance tuning and apply automatic, intelligent, and predictive technologies to mitigate the burden on today's scientists and programmers. Currently, no solutions exist that automate and simplify the performance analysis and tuning cycle. The only known solutions for determining application performance bottlenecks today are solutions that involve manual intervention by users.

Therefore, it would be beneficial to have an improved computer implemented method, system, and computer usable program code for providing an extensible infrastructure that automates the detection of performance bottlenecks in any application on any given system.

SUMMARY OF THE INVENTION

Illustrative embodiments provide a computer implemented method, system, and computer usable program code for detecting performance bottlenecks in a target application. In response to receiving hotspot selections from a user interface, bottleneck rules are extracted from a database. A hotspot is a region of source code that exceeds a time threshold to execute in the target application. Then, metrics, which are needed to evaluate the bottleneck rules extracted from the database, are identified. These identified metrics are then computed. Afterward, it is determined whether each bottleneck rule extracted from the database is evaluated to true using the computed metrics for hotspots in the target application. In response to determining that a bottleneck rule is evaluated to true using an appropriate computed metric corresponding to the bottleneck rule, a bottleneck description is created for the bottleneck rule. Then, the bottleneck description is sent to the user interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an exemplary illustration of the content of a bottleneck detection engine database in accordance with an illustrative embodiment;

DETAILED DESCRIPTION OF THE PREFERRED EMBODIMENT

Figure 1:
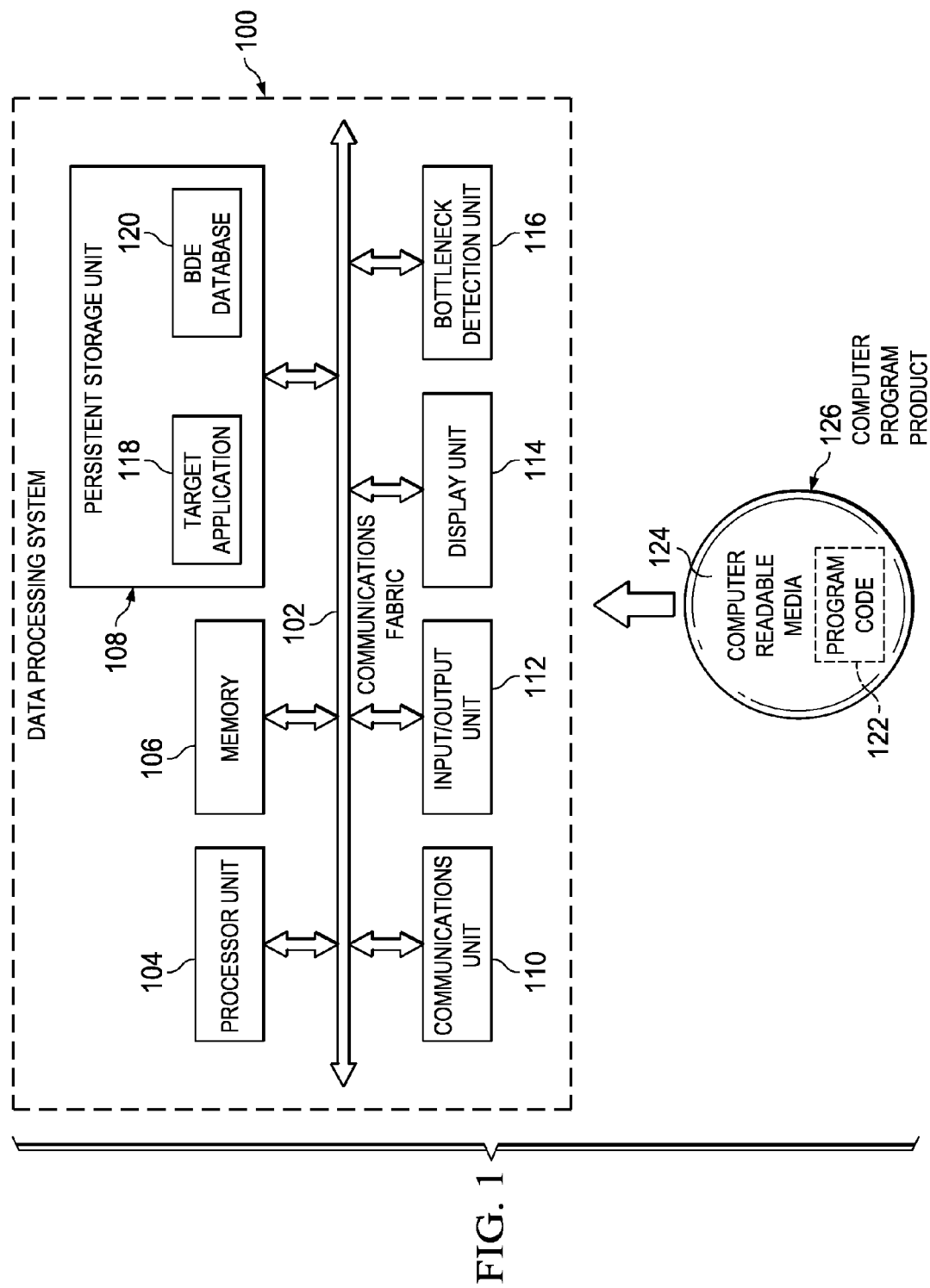
FIG. 1 is a diagram of a data processing system in which illustrative embodiments may be implemented.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

FIG. 1 depicts a diagram of a data processing system in which illustrative embodiments may be implemented. In this illustrative example, data processing system 100 includes communications fabric 102, which provides communications between processor unit 104, memory unit 106, persistent storage unit 108, communications unit 110, input/output (I/O) unit 112, display unit 114, and bottleneck detection unit 116.

Processor unit 104 serves to execute instructions for software that may be loaded into memory unit 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory unit 106, in these examples, may be, for example, a random access memory (RAM). Persistent storage unit 108 may take various forms depending on the particular implementation. For example, persistent storage unit 108 may contain one or more components or devices, such as a hard drive, a flash memory, a rewritable optical disk, a rewritable magnetic tape, or some combination of the above. The media used by persistent storage unit 108 also may be removable. For example, a removable hard drive may be used for persistent storage unit 108.

Persistent storage unit 108 enables the storage, modification, and retrieval of data. Persistent storage unit 108 includes target application 118 and bottleneck detection engine (BDE) database 120. Target application 118 is a software application that a user selects as a target for hotspot analysis by bottleneck detection unit 116. Target application 118 may be any type of software application, such as, for example, a high performance scientific application. In addition, target application 118 may represent a plurality of software applications within persistent storage unit 108.

Bottleneck detection unit 116 utilizes BDE database 120 to store data regarding the hotspot analysis of target application 118. BDE database 120 may store this data in, for example, a relational or structured format in one or more tables. However, it should be noted that database 120 may also store this data in an unstructured format as well. In addition, BDE database 120 may represent a plurality of databases.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display unit 114 provides a mechanism to display information to the user.

Bottleneck detection unit 116 is the component that enables illustrative embodiments to provide an extensible infrastructure that automates the detection of performance bottlenecks in any application on any given system. In particular, bottleneck detection unit 116 manages the defining of performance bottlenecks in target application 118 and the automatic detection of pre-defined hotspots, which are stored in BDE database 120. In addition, bottleneck detection unit 116 correlates the execution performance data of target application 118 with the application's source code and presents this correlation information to a user via display unit 114 in an easily understood, interactively-browsable form to speed up the process of identifying application performance problems. Also, bottleneck detection unit 116 provides a user with control over the granularity of the augmentation or instrumentation process and the data collection process in order to support profiling of large high performance applications. Moreover, bottleneck detection unit 116 provides for performance data comparisons across multiple application executions and across multiple granularities.

It should be noted that bottleneck detection unit 116 may be implemented entirely as software, entirely as hardware, or as a combination of both software and hardware. Further, a user, such as a system administrator, may enable and disable bottleneck detection unit 116 independently of other data processing system 100 features and components. Furthermore, it should be noted that bottleneck detection unit 116 may be located remotely in another data processing system, such as, a server or client device, connected to data processing system 100 via a network through communications unit 110.

Instructions for an operating system and applications or programs, such as target application 118, are located on persistent storage unit 108. These instructions may be loaded into memory unit 106 for execution by processor unit 104. The processes of different illustrative embodiments may be performed by processor unit 104 using computer implemented instructions, which may be located in a memory, such as memory unit 106. These instructions are referred to as, program code, computer usable program code, or computer readable program code that may be read and executed by a processor in processor unit 104. The program code in the different illustrative embodiments may be embodied on different physical or tangible computer readable media, such as memory unit 106 or persistent storage unit 108.

Program code 122 is located in a functional form on computer readable media 124 and may be loaded onto or transferred to data processing system 100 for execution by processor unit 104. Program code 122 and computer readable media 124 form computer program product 126 in these examples. In one example, computer readable media 124 may be in a tangible form, such as, for example, an optical or magnetic disc that is inserted or placed into a drive or other device that is part of persistent storage unit 108 for transfer onto a storage device, such as a hard drive that is part of persistent storage unit 108. In a tangible form, computer readable media 124 also may take the form of a persistent storage, such as a hard drive or a flash memory that is connected to data processing system 100. The tangible form of computer readable media 124 is also referred to as computer recordable storage media.

Alternatively, program code 122 may be transferred to data processing system 100 from computer readable media 124 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different illustrative embodiments may be implemented. The different illustrative embodiments may be implemented in a data processing system including components in addition to, or in place of, those illustrated for data processing system 100. Other components shown in FIG. 1 may be varied from the illustrative examples shown.

For example, a bus system may be used to implement communications fabric 102 and may comprise one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory unit 106 or a cache, such as found in an interface and memory controller hub, which may be present in communications fabric 102.

Illustrative embodiments provide a computer implemented method, system, and computer usable program code for automatic detection of performance bottlenecks in a target application. In response to receiving hotspot and bottleneck dimension selections from a user interface, a BDE extracts bottleneck rules, which belong to the selected bottleneck dimension, from a BDE database. A hotspot is a region of source code or address space that exceeds a time threshold to execute in a target application.

Then, the BDE parses the bottleneck rules that were extracted from the BDE database. Then, the BDE identifies all metrics, along with their corresponding parameters, needed to evaluate the extracted bottleneck rules. Subsequently, the BDE sends a request to a module scheduler to compute the identified metrics.

After receiving all the computed metrics from the module scheduler, the BDE evaluates the extracted bottleneck rules using the computed metrics. Then, the BDE determines whether each extracted bottleneck rule is evaluated to true. If a bottleneck rule is evaluated to true, then the BDE creates a bottleneck description for the bottleneck rule and sends the bottleneck description to the user interface for a user to review.

Thus, illustrative embodiments provide a novel extensible method for defining and characterizing metrics that allow for automated quantification of system performance relative to the corresponding application program organization. Extensible means that a user or developer may expand or add to the method's capabilities on an as needed basis. A metric is a measurement of a particular characteristic of an application's performance or efficiency.

The extensibility of this schema provides for the ability to add new metrics, corresponding modules that abstract the metric data, and rules for combining the metrics into bottleneck definitions. A key concept of illustrative embodiments is this extensibility and the achievement of an infrastructure whereby the process of bottleneck discovery and the associated impact determination on the system is automated. In addition, illustrative embodiments may suggest performance improvement if a bottleneck is eliminated from the target application.

This extensible infrastructure for automated detection of application performance bottlenecks is based on a unique classification scheme consisting of modules. Typically, these modules are correlated to the machine's subsystems and are used to abstract the performance data of the target application into a multi-dimensional space for automated analysis for the presence of bottlenecks.

Each metric has a corresponding logical module, which is responsible for computing or estimating the respective metric. The association of the module to the metric is defined in the BDE database within a table. A module is a program and may provide more than one metric, depending on the different parameters the module accepts.

Each module abstracts certain performance characteristics of the target application, which may be used to define potential "bottlenecks". A bottleneck is anything that inhibits the potential for the target application to execute faster on a given system and is correctable. Bottleneck rules are defined by means of logical expressions, which employ metrics that are combined with arithmetic and logical operators. These bottleneck rules may be evaluated to either true or false.

An example of a bottleneck rule is "#L1Misses >100". In other words, a bottleneck exists when over 100 L1 cache misses occurs in the system. This exemplary bottleneck rule involves the metric "#L1Misses".

Another example of a bottleneck rule is "#LoadStore Ops >#ArithOps". This exemplary rule involves the metric "#LoadStoreOps" and the metric "#ArithOps". Thus, a metric may depend on another metric or on a combination of other metrics. Also, a metric may depend on a parameter. For example, in the metric "#L1Misses(Power4)", "Power4" is the parameter.

A user may add a new metric to the infrastructure by plugging in a module that provides the metric and then registering the association between the metric and the module in the BDE database. The separation between bottleneck definition and performance data collection, the abstraction of performance data collection as modular operations, the ability to combine performance metrics in arbitrary ways to define new bottlenecks, and the ease with which new metrics may be added to the infrastructure make illustrative embodiments a powerful framework for detecting performance bottlenecks. In addition, as new bottlenecks are identified and the signatures of these new bottlenecks are added to the BDE database, the infrastructure of an illustrative embodiment grows. Furthermore, illustrative embodiments may ask intelligent questions in the form of queries against performance metric tables within the BDE database.

Figure 2:
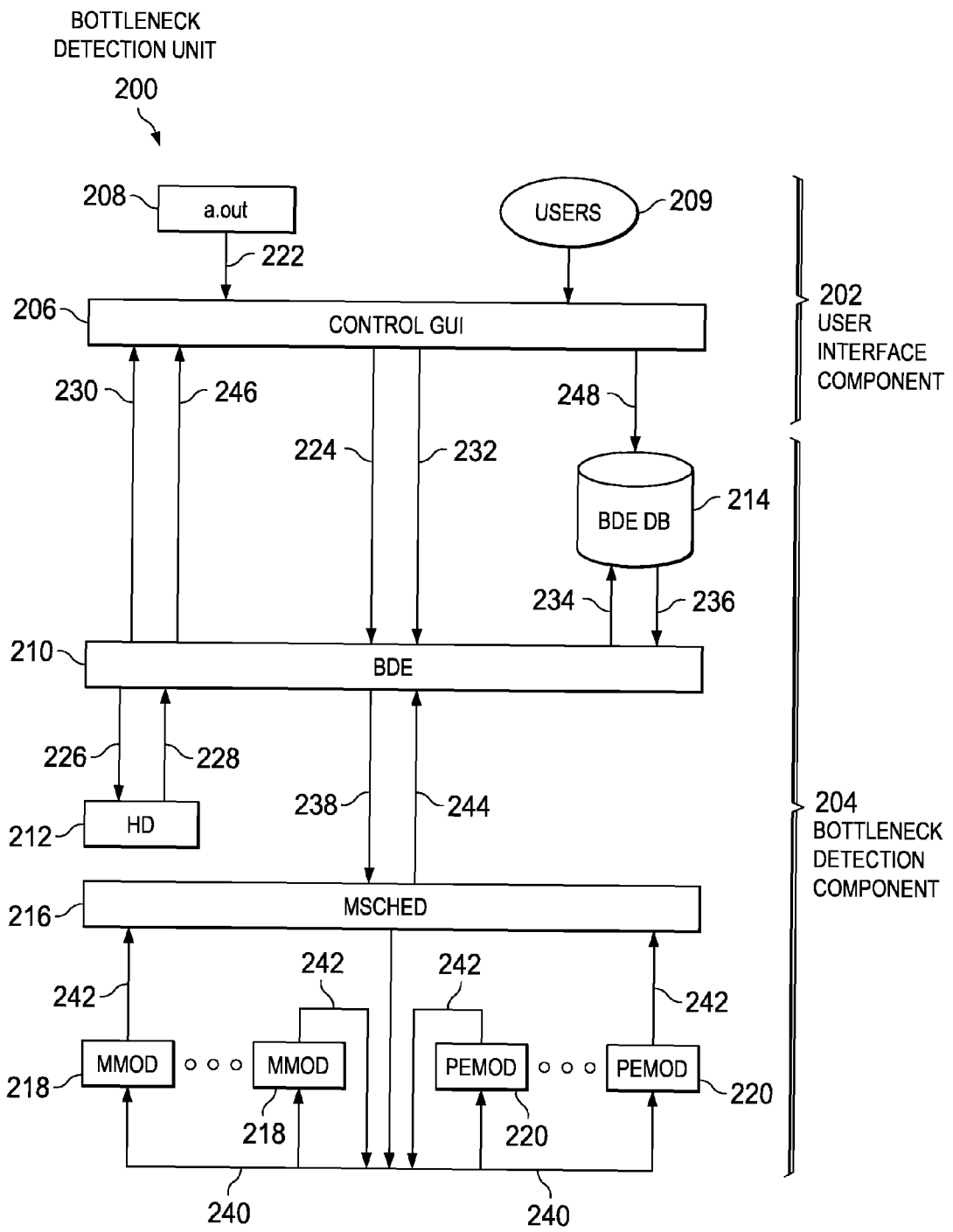
FIG. 2 is an exemplary illustration of a bottleneck detection unit in accordance with an illustrative embodiment.

With reference now to FIG. 2, an exemplary illustration of a bottleneck detection unit is depicted in accordance with an illustrative embodiment. Bottleneck detection unit 200 may, for example, be bottleneck detection unit 116 in FIG. 1 and may be implemented in a data processing system, such as data processing system 100 in FIG. 1. Bottleneck detection unit 200 includes user interface component 202 and bottleneck detection component 204.

User interface component 202 is a component that a user, such as, user 209, may utilize to interact with bottleneck detection component 204. User interface component 202 includes control graphical user interface (GUI) 206 and a.out 208. Bottleneck detection component 204 is a component that detects performance bottlenecks in a target application, such as target application 118 in FIG. 1. Bottleneck detection component includes BDE 210, hotspot detector (HD) 212, BDE database (DB) 214, module scheduler (MSCHED) 216, metric modules (MMOD) 218, and performance estimation modules (PEMOD) 220.

Communication between components of bottleneck detection unit 200 is indicated by arrows, which connect the different components. The direction of information flow is indicated by the direction of each arrow. In addition, associated with each arrow is a collection of information to be exchanged, which is called an interface, between the components. Each interface is labeled with a reference number for ease of identification.

Control GUI 206 is a user interaction handler for handling any interaction with user 209. The primary role of control GUI 206 is to coordinate the operations of the framework for bottleneck detection unit 200, request and provide information from and to user 209, and display the results to user 209 via a display unit, such as display unit 114 in FIG. 1. However, it should be noted that control GUI 206 is by no means mandatory. In other words, similar functionality may be provided by a text-only control interface as well.

Initially, control GUI 206 receives a target application in the form of a binary executable from user 209. In addition, the source code, such as a.out 208, which is used to produce the binary executable, may also be present within the system on a storage unit, such as persistent storage unit 108 in FIG. 1. After receiving the target application via interface 222 in the form of binary executables, sources, makefiles, and configurations, control GUI 206 issues a request to BDE 210 via interface 224. Interface 224 provides the binary executables and the executables parameters and locations to BDE 210.

BDE 210 analyzes the target application by collecting performance data during execution of the target application and detecting any previously defined bottlenecks within the target application. Further, BDE 210 requests hotspot detector 212, via interface 226, to profile the target application, provide a summary of hotspots within the target application, and list all source code files used to produce the binary executable for the target application. Hotspot detector 212 returns this requested information to BDE 210 via interface 228.

Subsequent to receiving the requested information from hotspot detector 212, BDE 210 sends this information, via interface 230, to control GUI 206 for user 209 to review. After reviewing the profile data, the summary of hotspots, and the list of all source code files used to produce the binary executable for the target application, user 209 then has the option to guide BDE 210, via control GUI 206, with regard to which source code regions and which hotspots to analyze. For example, user 209 may examine the profile data and optionally choose to narrow the analysis of the target application to only user-selected hotspots. This is opposed to the default behavior of analyzing all hotspots within the entire target application. Also, after reviewing the source code regions associated with each of the hotspots, user 209 may only select specific contiguous regions of source statements for analysis.

Also, performance bottlenecks may be classified as belonging to a particular dimension, such as, for example, a CPU bottleneck dimension, a memory bottleneck dimension, an I/O bottleneck dimension, a communication bottleneck dimension, or a thread bottleneck dimension. However, it should be noted that illustrative embodiments are not limited to the above-listed bottleneck dimensions. Illustrative embodiments may include more or fewer bottleneck dimensions as needed.

User 209 may instruct bottleneck detection component 204 to look for bottlenecks in only user-selected dimensions. However, bottleneck detection component 204 may be configured to check for bottlenecks in all dimensions by default.

Then, control GUI 206 again invokes BDE 210, via interface 232, and requests that BDE 210 perform the performance analysis on the selected regions of the source code and the selected bottleneck dimensions. A bottleneck may have an associated performance improvement metric. This performance improvement metric represents an expected improvement in performance when the bottleneck is removed. A bottleneck is removed when the application or the system is changed in such a way that the rule associated with the bottleneck evaluates to false.

It should be noted that a performance improvement metric must also have an associated module, such as performance estimation module 220, which is responsible for computing the performance improvement metric. The association between the performance improvement metric and corresponding performance estimation module 220 is recorded in BDE database 214. All the bottleneck, module, and metric data are stored in BDE database 214, which is represented by interface 234.

After receiving the user-specified hotspot information from control GUI 206, via interface 232, BDE 210 consults BDE database 214, via interface 234, and extracts a list of all bottlenecks that correspond to one of the dimensions selected by the user. Then, BDE 210 parses the bottleneck rules associated with the selected dimension. Subsequent to parsing the rules, BDE 210 extracts a list of all metrics, along with their corresponding parameters, which are needed to evaluate the bottleneck rules. Afterward, BDE 210 issues a request to module scheduler 216, via interface 238, for module scheduler 216 to pass to BDE 210 a list of all metrics that need to be computed.

Module scheduler 216 is responsible for executing metric modules 218 and performance estimation modules 220, which correspond to the specific metrics requested by BDE 210. In addition, module scheduler 216 is responsible for collecting and returning these requested metrics, which also include performance estimation metrics, to BDE 210. The information regarding the association between a metric and a corresponding metric module or performance estimation module is transmitted to module scheduler 216 via interface 238.

Module scheduler 216 uses the association information to direct the appropriate modules to compute the requested metrics via interface 240. Metric modules 218 and performance estimation modules 220 may individually specify a mode of execution. This specified mode of execution prescribes whether a module may run in parallel with other modules or must run exclusively by itself.

Module scheduler 216 analyzes the dependencies between metrics (i.e., one metric may depend on other metrics and, therefore, one module may need to run before the others) and the specified mode of execution for each module. Then, module scheduler 216 appropriately schedules the appropriate modules to run, exploiting as much parallelism as possible, while preserving metric dependency and module mode of execution specifications.

Each directed metric module 218 and performance estimation module 220 returns its respective computed metric to module scheduler 216 via interface 242. After module scheduler 216 collects all the requested metrics, module scheduler 216 sends these requested metrics to BDE 210 via interface 244.

Subsequently, BDE 210 evaluates the bottleneck rules and composes a bottleneck description for all bottlenecks whose rule evaluates to true. This bottleneck description includes the name of the bottleneck, the region of the source code where the bottleneck was detected, and the estimated percentage of performance improvement when the bottleneck is removed. BDE 210 sends this bottleneck description information to control GUI 206 via interface 246 for user 209 to review.

After reviewing the bottleneck description information, user 209 then has the option to add new bottleneck definitions to BDE database 214 and/or modify or delete previously identified and stored bottleneck definitions in BDE database 214 via interface 248. Furthermore, user 209 may add newly created modules, such as metric or performance estimation modules, and/or modify or delete previously stored modules in BDE database 214 via interface 248. Moreover, user 209 may query database 214 via interface 248 to retrieve and review desired data.

After placing a newly created module in BDE database 214, user 209 should register this newly created module with BDE 210. User 209 may manually perform registration of this newly created module with BDE 210 or may perform registration by using another tool. User 209 may also register the corresponding metric(s) computed or estimated by the newly created module with BDE 210. In addition, these corresponding metrics may take optional arguments. As a result, these optional argument metrics may be registered with BDE 210 as well.

Hotspot detector 212 instruments or augments the target application and potentially the target application's environment, which includes entities that interact with the target application, such as the operating system, with probe libraries for performance data collection. Afterward, hotspot detector 212 executes the target application. Then, hotspot detector 212 profiles the target application during execution to find the most time-consuming regions of source code or address space. These regions of source code that consume significant amounts of time for execution are identified as hotspots. These hotspots may be determined by, for example, the use of default execution time thresholds or by user-defined thresholds. Also, these identified hotspots may or may not suggest performance problems. For example, some of these hotspot regions make full and efficient use of system resources and further tuning will not improve performance. In contrast, other hotspot regions are caused by inefficient use of system resources and further tuning will improve performance.

Hotspot detector 212 may perform this profiling in several ways depending on how the target application is augmented and executed. The target application may be augmented at the source code level, the binary level, or at the runtime level. In addition, this profiling may also be done in several bottleneck dimensions, such as, for example, the computation or CPU dimension, the communication dimension, or the I/O dimension.

One option for detecting a computation or CPU dimension bottleneck is to use the compiler profiling capability, which is the gprof approach. Using this gprof approach profiling option, the source code may be compiled in such a way that the necessary probes and runtime sampling libraries are inserted into the binary executable. This now augmented application may then run on the target system such that a distribution of execution time over the memory address spaces or program constructs is obtained. Depending on the threshold, which may be a preset threshold or a user-defined threshold, the source code regions that exceed the threshold time period to execute are considered hotspots. Hotspots may have different granularity, such as function level, statement level, basic block level, and instruction level.

One option for detecting a communication dimension bottleneck in message passing interface (MPI) applications is to use the PMPI profiling interface and library. MPI applications allow clusters of computers to communicate with one another. Finally, one option for detecting an I/O dimension bottleneck is to use I/O tracing.

Figure 3:
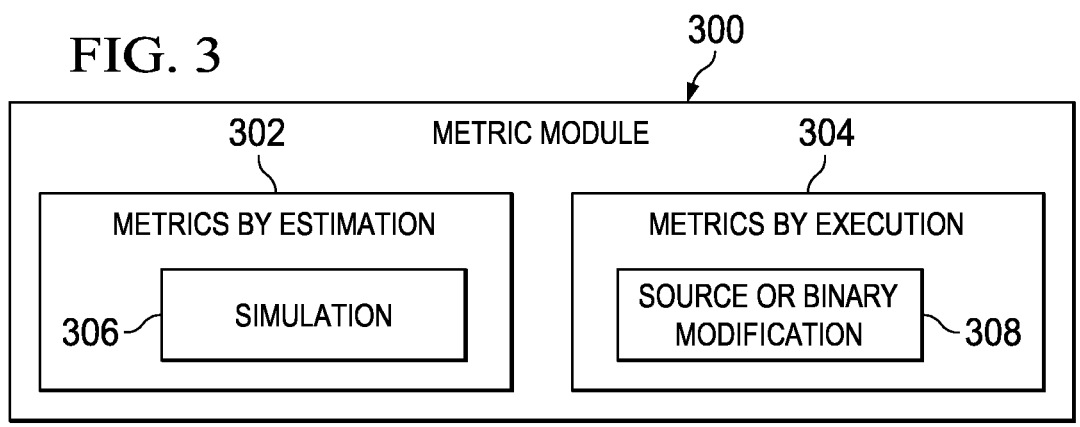
FIG. 3 is an exemplary illustration of a metric module in accordance with an illustrative embodiment.

With reference now to FIG. 3, an exemplary illustration of a metric module is depicted in accordance with an illustrative embodiment. Metric module 300 may, for example, be metric module 218 in FIG. 2. Metric module 300 includes sub-modules, such as metrics by estimation sub-module 302 and metrics by execution sub-module 304. However, it should be noted that metric module 300 is only intended as an exemplary metric module and, therefore, may include more or fewer sub-modules as needed by processes of illustrative embodiments.

Furthermore, metrics by estimation sub-module 302 and metrics by execution sub-module 304 may also include sub-modules, such as simulation sub-module 306 and source or binary modification sub-module 308, respectively. Metrics by estimation sub-module 302 may, for example, compute or estimate its respective metric(s) by utilizing information provided by simulation sub-module 306. Simulation sub-module 306 may, for example, parse and/or analyze the source code of a detected hotspot in a simulation and provide the necessary information to metrics by estimation sub-module 302 so that metrics by estimation sub-module 302 may compute or estimate its respective metric(s).

Similarly, metrics by execution sub-module 304 may, for example, compute or estimate its respective metric(s) by utilizing information provided by source or binary modification sub-module 308. Source or binary modification sub-module 308 may, for example, modify the source code or the binary executable of a target application and provide the modified code or executable to metrics by execution sub-module 304 so that metrics by execution sub-module 304 may compute or estimate its respective metric(s).

It should be noted that each sub-module may return one or more types of metrics. In addition, only some of the metrics may be requested by the module scheduler, such as module scheduler 216 in FIG. 2. Other metrics, which may represent performance improvements or other aspects of performance, may optionally be requested by another module or sub-module.

In an illustrative embodiment, modules may take input arguments in the form of a file. However, other input methods are possible. Similarly, output from a module may also be stored in a file. In another illustrative embodiment, the module output may be passed to another module for processing or the output may be communicated to the BDE framework in other forms.

Also, it should be noted that a typical module is often a binary executable, which implements a template provided by the BDE framework. However, other implementations, such as in the form of a shell script, are possible.

Figure 4:
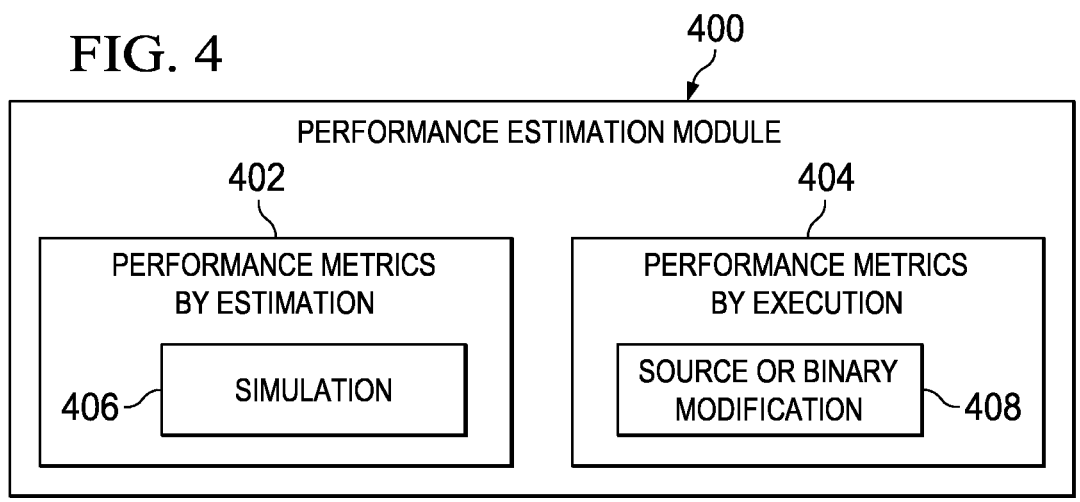
FIG. 4 is an exemplary illustration of a performance estimation module in accordance with an illustrative embodiment.

With reference now to FIG. 4, an exemplary illustration of a performance estimation module is depicted in accordance with an illustrative embodiment. Performance estimation module 400 may, for example, be performance estimation module 220 in FIG. 2. Performance estimation module 400 includes sub-modules, such as performance metrics by estimation sub-module 402 and performance metrics by execution sub-module 404. However, it should be noted that performance estimation module 400 is only intended as an exemplary performance estimation module and, therefore, may include more or fewer sub-modules as needed by processes of illustrative embodiments.

Furthermore, performance metrics by estimation sub-module 402 and performance metrics by execution sub-module 404 may also include sub-modules, such as simulation sub-module 406 and source or binary modification sub-module 408, respectively. Performance metrics by estimation sub-module 402 may, for example, compute or estimate its respective metric(s) by utilizing information provided by simulation sub-module 406. Simulation sub-module 406 may, for example, parse and/or analyze the source code of a detected hotspot in a simulation and provide the necessary information to performance metrics by estimation sub-module 402 so that performance metrics by estimation sub-module 402 may compute or estimate its respective metric(s).

Similarly, performance metrics by execution sub-module 404 may, for example, compute or estimate its respective metric(s) by utilizing information provided by source or binary modification sub-module 408. Source or binary modification sub-module 408 may, for example, modify the source code or the binary executable of a target application and provide the modified code or executable to performance metrics by execution sub-module 404 so that performance metrics by execution sub-module 404 may compute or estimate its respective metric(s).

In addition, performance metrics by execution sub-module 404, as well as source or binary modification sub-module 408, may transform the source code of the target application or the binary executable of the target application or may compile a runtime context of the target application in arbitrary ways. Loop unrolling and vectorizations of long latency floating point operations are just some examples of such transformations.

With reference now to FIG. 5, an exemplary illustration of the content of a bottleneck detection engine database is depicted in accordance with an illustrative embodiment. BDE database 500 may, for example, be BDE database 214 in FIG. 2. BDE database 500 includes bottleneck definition table 502, performance metrics table 504, modules table 506, and application execution metrics table 508. However, it should be noted that BDE database 500 is only shown as an example and, therefore, may include more or fewer tables as needed by processes of illustrative embodiments. Further, each table may, for example, reside in its own database.

Bottleneck definition table 502 contains the bottleneck rule definitions. Each entry in bottleneck definition table 502 includes: the name of the bottleneck; the name of the dimension(s) that are involved with the bottleneck; a description of the bottleneck; the rule or logical expression to be evaluated; the estimated performance improvement when this bottleneck is removed; and a reserved field that may contain bottleneck-specific information.

In this example, bottleneck definition table 502 defines an "unroll-op" bottleneck. This definition is provided by a module that checks for an unrolling opportunity that the compiler neglected. This type of bottleneck is a CPU dimension bottleneck. To evaluate the presence of this bottleneck in the system, the module calculates the metric "unrollimprovement". If this "unrollimprovement" metric is greater than a specified threshold, then the BDE determines that this bottleneck exists. Also, the BDE returns the metric for the estimate of performance improvement if the bottleneck is removed.

Performance metrics table 504 contains the metric definitions. In addition, performance metrics table 504 includes the names of the respective modules responsible for collecting these metrics. Each entry in performance metrics table 504 includes: the name of the metric; the name of the module that collects this metric; the input parameter to this metric; and a description of this metric.

In this example, performance metrics table 504 defines a metric named "PM_CYCLE". This "PM_CYCLE" metric is collected by the module named "hpm_pwr5". This metric measures the number of processor cycles taken for a certain program. Also in this example, no parameter exists for this metric.

Modules table 506 specifies the program to invoke. Modules table 506 contains the module definitions. Each entry in modules table 506 includes: the name of the module; the location of the module; the execution mode of the module; and a description of the module.

In this example, modules table 506 defines a module named "hpm_pwr5". This "hpm_pwr5" module corresponds to a binary executable, which is located in "/usr/bin/hpm_pwr5". In addition, this module is described as a hardware performance monitor. The "/usr/bin/hpm_pwr5" program is run in an exclusive mode.

Bottleneck definition table 502, performance metrics table 504, and modules table 506 are collectively called BDE database 500. An expert user or system administrator, such as user 209 in FIG. 2, may edit BDE database 500 by adding new rules, metrics, and modules to their respective tables and modifying or deleting existing ones. A user interface interaction handler, such as control GUI 206 in FIG. 2, provides interfaces for the user to access BDE database 500.

In general, illustrative embodiments provide an extensible infrastructure for the BDE by allowing the user to add new metrics, bottleneck rules, and modules, which are responsible for collecting the added metrics and for estimating the impact of the added solutions, to BDE database 500 as needed. By providing this extensible infrastructure, illustrative embodiments expand the capability of the BDE to detect performance bottlenecks in other high performance computing applications.

BDE database 500 includes one additional table, which is application execution metrics table 508, to record all application execution performance data. Each entry in application execution metrics table 508 includes: the run number of the target application; the name of the target application; the configuration of the target application; hotspot(s) in the target application; the corresponding metric(s); and the associated metric threshold value(s).

In this example, application execution metrics table 508 records a run number of "1000" for a target application named "LS-DYNA", which is configured as a "POWER 5+SMT" application. In addition, a possible hotspot is detected in this target application by the "PM_CYCLE" metric, which exceeded the "1000" value threshold, in the "COMPUTE" or CPU dimension. The user interface interaction handler may facilitate queries from the user into the history of target application runs in order for the user to retrieve and review this type of recorded information.

Figure 6:
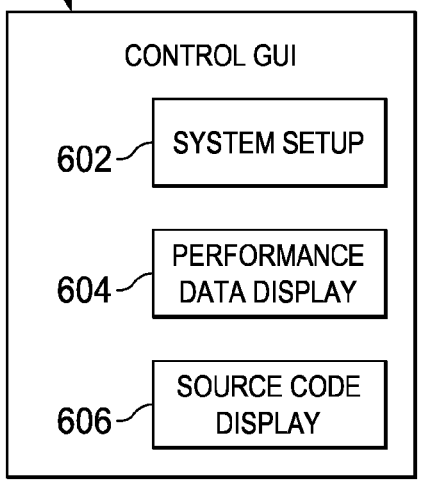
FIG. 6 is an exemplary block diagram of a control graphical user interface in accordance with an illustrative embodiment.

With reference now to FIG. 6, an exemplary block diagram of a control graphical user interface is depicted in accordance with an illustrative embodiment. Control GUI 600 may, for example, be control GUI 206 in FIG. 2. Control GUI 600 includes system setup 602, performance data display 604, and source code display 606. However, it should be noted that control GUI 600 is only intended as an example and, therefore, may include more or fewer components as needed by processes of illustrative embodiments.

System setup 602 allows a user, such as user 209 in FIG. 2, to configure the information necessary to operate the BDE framework, such as, for example, machine name, application name, application location, and environment variables. Performance data display 604 presents execution performance data for a target application, such as, for example, function location within the source code, time spent in a function, and hotspot evaluation results. Source code display 606 shows the source code for the target application for a given function location. Source code display 606 may work in conjunction with performance data display 604.

The functionality of control GUI 600 may, for example, include: accepting an input binary executable for a target application; making an initial request to a BDE, such as BDE 210 in FIG. 2, to perform target application profiling; receiving the profiling data and a list of source files; displaying the profiling data and source file list to the user; accepting user selections of specific hotspots or code regions for evaluation; accepting user selections of specific bottleneck dimensions; invoking the BDE; and displaying returned bottleneck descriptions to the user.

Figure 7:
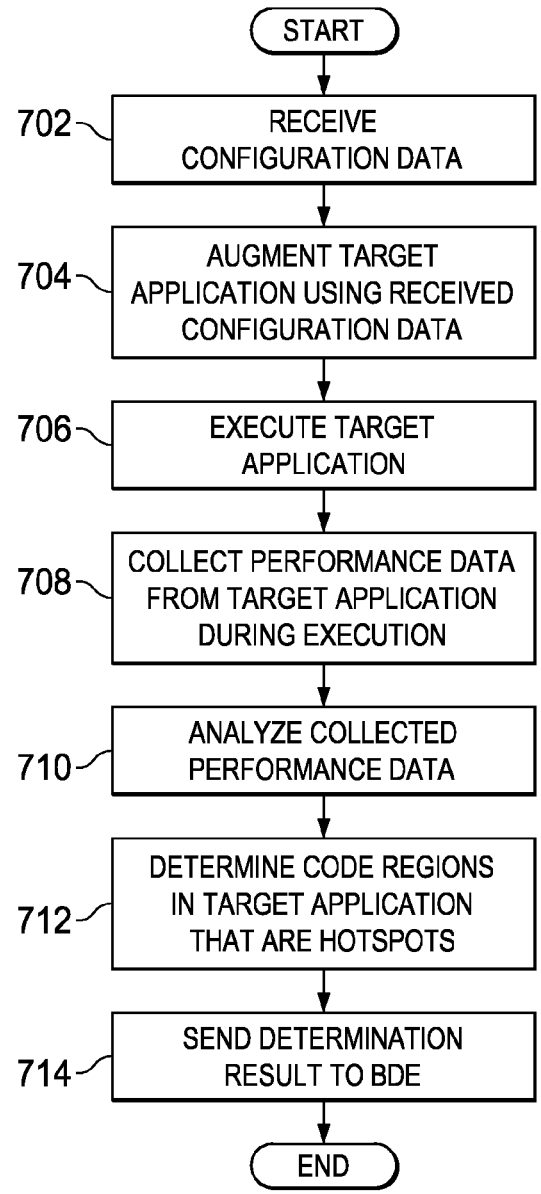
FIG. 7 is a flowchart illustrating an exemplary process for determining hotspots in an application in accordance with an illustrative embodiment.

With reference now to FIG. 7, a flowchart illustrating an exemplary process for determining hotspots in an application is shown in accordance with an illustrative embodiment. The process shown in FIG. 7 may be implemented in a hotspot detector, such as hotspot detector 212 in FIG. 2.

The process begins when the hotspot detector receives configuration data from a BDE, such as BDE 210 in FIG. 2 (step 702). The configuration data may, for example, include hotspot granularity, augmentation or instrumentation method, input parameters, profiling dimensions, and the target application, such as target application 118 in FIG. 1, which is to be analyzed. Then, the hotspot detector augments or instruments the target application using the received configuration data (step 704). Subsequent to augmenting the target application in step 704, the hotspot detector executes the target application (step 706) and collects performance or profiling data from the target application during execution (step 708). After collecting all of the performance data in step 708, the hotspot detector analyzes the collected performance data (step 710) and determines which code regions in the target application are hotspots (step 712). Then, the hotspot detector sends the result of the hotspot determinations to the BDE (step 714). The process terminates thereafter.

Figure 8:
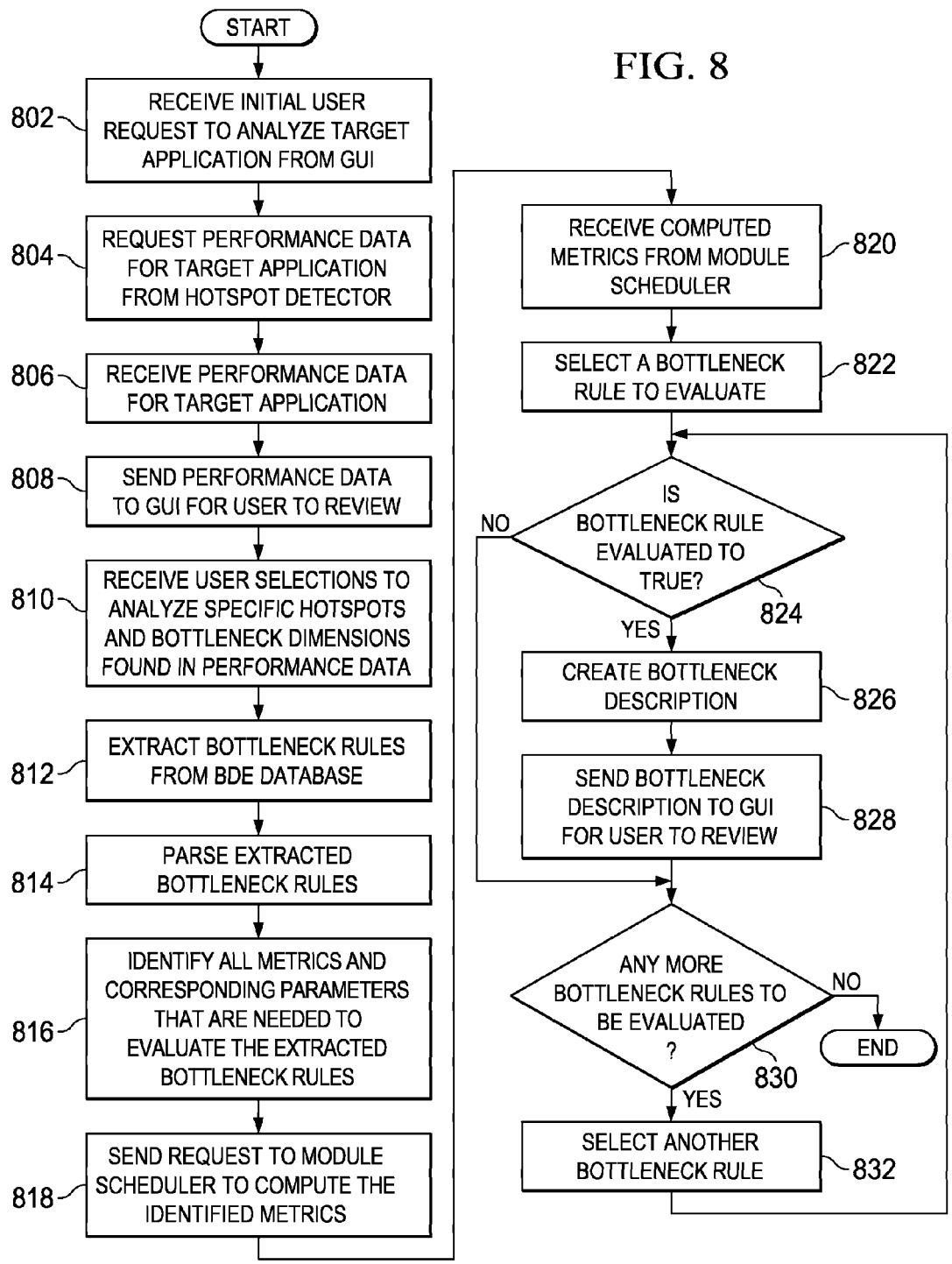
FIG. 8 is a flowchart illustrating an exemplary process for evaluating bottleneck rules on selected hotspots in accordance with an illustrative embodiment.

With reference now to FIG. 8, a flowchart illustrating an exemplary process for evaluating bottleneck rules on selected hotspots is shown in accordance with an illustrative embodiment. The process shown in FIG. 8 may be implemented in a bottleneck detection unit, such as bottleneck detection unit 200 in FIG. 2.

The process begins when the bottleneck detection unit uses a BDE, such as BDE 210 in FIG. 2, to receive an initial user request to analyze a target application, such as target application 118 in FIG. 1, from a control GUI, such as control GUI 206 in FIG. 2 (step 802). Then, the BDE requests performance data for the target application from a hotspot detector, such as hotspot detector 212 in FIG. 2 (step 804). Subsequently, the BDE receives the requested performance data for the target application (step 806). Afterward, the BDE sends the performance data for the target application to the control GUI for the user to review (step 808).

Then, the BDE receives user selections from the control GUI to analyze specific hotspots and bottleneck dimensions found in the performance data (step 810). Afterward, the BDE extracts bottleneck rules from a BDE database, such as BDE database 214 in FIG. 2 (step 812). By default or by user selection, the BDE may extract all the bottleneck rules against the user-selected hotspots. However, these bottleneck rules may be categorized into different bottleneck dimensions, such as, for example, a computation bottleneck, a communication bottleneck, etc. As a result, the user may request that the BDE extract only bottleneck rules that belong to a selected dimension for evaluation.

Then, the BDE parses the extracted bottleneck rules (step 814) and identifies all metrics, along with their corresponding parameters, that are needed to evaluate the extracted bottleneck rules (step 816). Subsequently, the BDE sends a request to a module scheduler, such as module scheduler 216 in FIG. 2, to compute or estimate the identified metrics (step 818). The module scheduler utilizes corresponding logical metric and performance estimation modules, such as metric modules 218 and performance estimation modules 222 in FIG. 2, to calculate or estimate each particular identified metric.

Then, the BDE receives the computed metrics from the module scheduler (step 820). Afterward, the BDE selects one of the extracted bottleneck rules to evaluate (step 822). After selecting a bottleneck rule in step 822, the BDE makes a determination as to whether the bottleneck rule is evaluated to true using the appropriate calculated metric(s) corresponding to the selected bottleneck rule (step 824). If the bottleneck rule is not evaluated to true (i.e., evaluated to false), no output of step 824, then the process proceeds to step 830. If the bottleneck rule is evaluated to true, yes output of step 824, then the BDE creates a bottleneck description (step 826).

Subsequently, the BDE sends the bottleneck description to the control GUI for the user to review (step 828). In addition, the BDE makes a determination as to whether any more bottleneck rules need to be evaluated (step 830). If more bottleneck rules need to be evaluated, yes output of step 830, then the BDE selects another bottleneck rule (step 832) and the process returns to step 824 where the BDE makes a determination as to whether the bottleneck rule evaluates to true. If no more bottleneck rules need to be evaluated, no output of step 830, then the process terminates thereafter.

Figure 9:
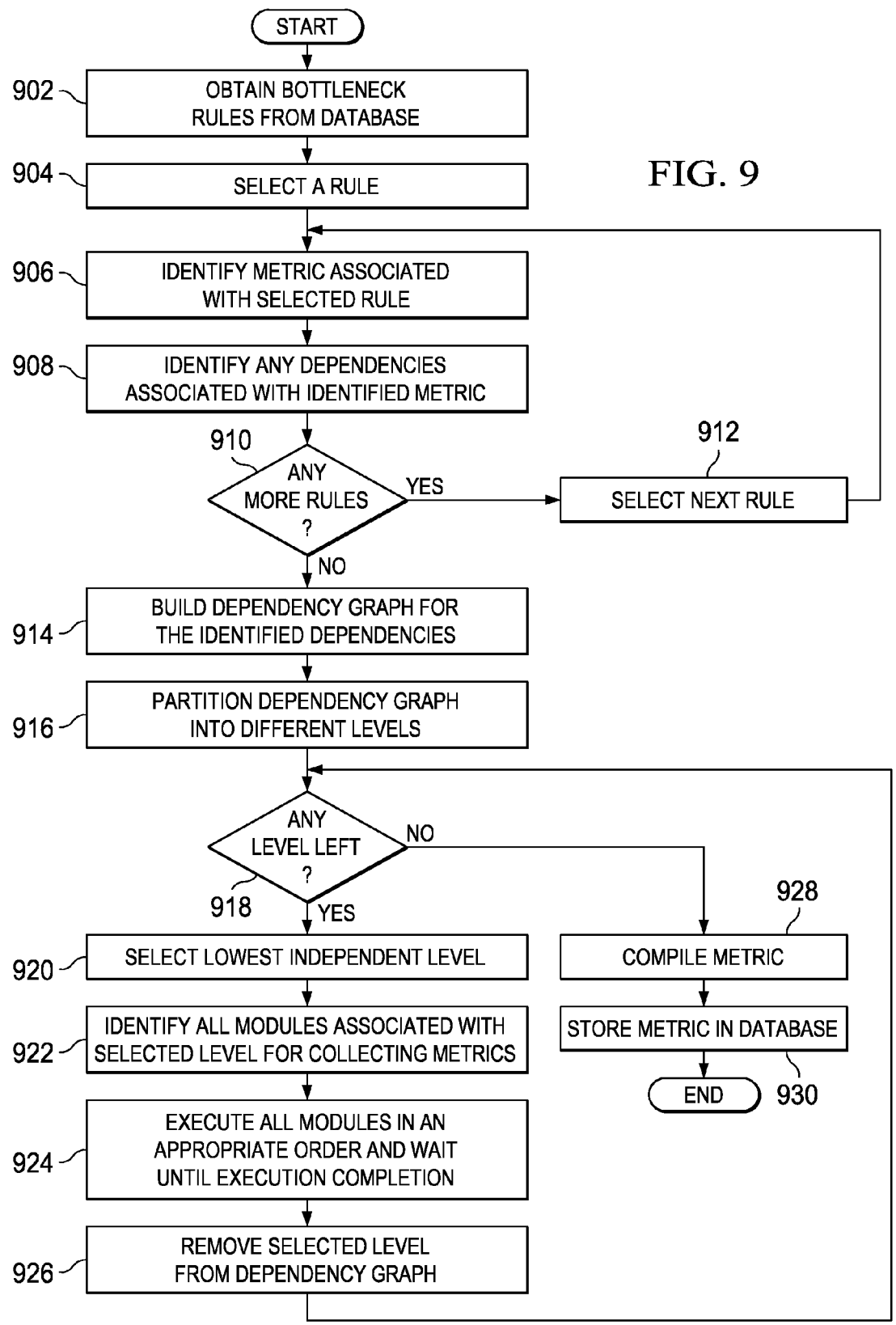
FIG. 9 is a flowchart illustrating an exemplary process for invoking modules to collect metric data in an appropriate order in accordance with an illustrative embodiment.

With reference now to FIG. 9, a flowchart illustrating an exemplary process for invoking modules to collect metric data in an appropriate order is shown in accordance with an illustrative embodiment. The process shown in FIG. 9 may be implemented in a module scheduler, such as module scheduler 216 in FIG. 2.

The module scheduler parses bottleneck rules and invokes the corresponding modules for metric collection in an appropriate order. The ordering of metric collection is necessary because dependencies among metrics may exist. For example, if the derivation of metric 1 involves metric 2 and metric 3, then metric 2 and metric 3 must be collected prior to collecting metric 1. In addition, some metrics may be collected in parallel, while other metrics must be collected in an exclusive mode.

The process begins when the module scheduler obtains bottleneck rules from a BDE database, such as BDE database 214 in FIG. 2 (step 902). Then, the module scheduler selects one of the obtained bottleneck rules (step 904) and identifies the metric associated with the selected rule (step 906). Then, the module scheduler identifies any dependencies associated with the identified metric (step 908).

Subsequently, the module scheduler makes a determination as to whether there are any more obtained bottleneck rules (step 910). If more bottleneck rules exist, yes output of step 910, then the module scheduler selects the next bottleneck rule (step 912) and the process returns to step 906 where the module scheduler identifies the metric associated with the selected bottleneck rule. If no more bottleneck rules exist, no output of step 910, then the module scheduler builds a dependency graph for the identified dependencies (step 914). The dependency graph uses a metric as the node and any dependency with another metric as an edge. An edge shoots out from the metric toward another metric it is dependent upon.

After building the dependency graph in step 914, the module scheduler partitions the dependency graph into different levels (step 916). The module scheduler partitions the dependency graph into different levels such that within each level no dependency among metrics exists. One way to do this is to sort the nodes by their out-degrees and label all nodes with out-degree zero, which is the lowest level, level zero. Then, remove all vertices in level zero and edges that incident to these vertices. Then, place all vertices with out-degree zero into level one. Iterate until no nodes are left in the graph. For a metric that is run in an exclusive mode, place that metric in a level by itself.

Then, the module scheduler makes a determination as to whether any levels are left (step 918). If more levels are left, yes output of step 918, then the module scheduler selects the lowest independent level (step 920) and identifies all modules associated with the selected level for collecting specific metrics (step 922). Subsequent to identifying all modules associated with the selected level in step 922, the module scheduler executes all the modules in an appropriate order and waits until all the modules complete execution to collect the specific metrics (step 924). Then, the module scheduler removes the selected level from the dependency graph (step 926) and the process returns to step 918 where the module scheduler makes a determination as to whether any more levels exist.

If no more levels exist, no output of step 918, then the module scheduler compiles the metric from the metrics collected from the modules (step 928). Afterward, the module scheduler stores the compiled metric in the BDE database (step 930). The process terminates thereafter.

Thus, illustrative embodiments provide a computer implemented method, system, and computer usable program code for providing an extensible infrastructure that automates the detection of performance bottlenecks in any application on any given system. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for detecting performance bottlenecks in a target application, the computer implemented method comprising:

responsive to receiving, by a data processing system, hotspot selections from a user interface, wherein a hotspot is a region of source code that exceeds a time threshold to execute in the target application, extracting, by the data processing system, a plurality of bottleneck rules from a database to analyze the hotspot selections to detect the performance bottlenecks;

identifying, by the data processing system, a metric for each bottleneck rule in the plurality of bottleneck rules extracted from the database, wherein each identified metric is used to evaluate its associated bottleneck rule;

responsive to identifying, by the data processing system, a metric for each bottleneck rule in the plurality of bottleneck rules, identifying, by the data processing system, execution order dependencies among different metrics associated with the plurality of bottleneck rules to form identified execution order dependencies among the different metrics;

building, by the data processing system, a dependency graph based on the identified execution order dependencies among the different metrics;

partitioning, by the data processing system, the dependency graph based on the identified execution order dependencies among the different metrics into different levels so that no execution order dependency among the different metrics exists within a particular level of the different levels;

identifying, by the data processing system, modules associated with each of the different levels that are used to compute the different metrics;

executing, by the data processing system, the modules associated with a level in an appropriate order one successive level after another to compute the different metrics to form computed metrics;

determining, by the data processing system, whether each bottleneck rule is evaluated to true using the computed metrics;

responsive to determining, by the data processing system, that a bottleneck rule is evaluated to true using an associated computed metric, creating, by the data processing system, a bottleneck description for the bottleneck rule; and sending, by the data processing system, the bottleneck description to the user interface.

2. The computer implemented method of claim 1, further comprising:

responsive to receiving configuration data for the target application, augmenting the target application using the configuration data to form an augmented target application;

executing the augmented target application;

collecting performance data from the augmented target application during execution to form collected performance data;

analyzing the collected performance data; and responsive to analyzing the collected performance data, determining source code regions within the augmented target application that are hotspots.

3. The computer implemented method of claim 1, wherein the identified execution order dependencies among the different metrics determine partial ordering for module execution.

4. The computer implemented method of claim 3, wherein a mode of execution for a module determines partial ordering for the module execution, and wherein the mode of execution is one of an exclusive execution mode or a parallel execution mode.

5. The computer implemented method of claim 1, wherein the metric has a corresponding logical module that is responsible for computing the metric.

6. The computer implemented method of claim 1, wherein the modules are one of a metric module or a performance estimation module.

7. The computer implemented method of claim 6, wherein the performance estimation module estimates a performance improvement when a performance bottleneck is eliminated from the target application.

8. The computer implemented method of claim 7, wherein the performance bottleneck is eliminated when the target application is changed so that a bottleneck rule associated with the performance bottleneck evaluates to false.

9. The computer implemented method of claim 1, wherein a performance bottleneck inhibits the target application from executing faster on a given system.

10. The computer implemented method of claim 1, wherein the data processing system uses a bottleneck detection unit to perform the extracting, identifying, building, partitioning, executing, determining, creating, and sending steps, and wherein the bottleneck detection unit provides an extensible infrastructure that automates detection of performance bottlenecks in any application.

11. The computer implemented method of claim 1, wherein the performance bottlenecks are classified in bottleneck dimensions.

12. The computer implemented method of claim 1, wherein the bottleneck description includes a name of a performance bottleneck, a region of source code where the performance bottleneck is detected, and an estimated percentage of performance improvement when the performance bottleneck is eliminated.

13. The computer implemented method of claim 1, wherein the metric is a measurement of a particular performance characteristic of the target application.

14. A data processing system for detecting performance bottlenecks in a target application, the data processing system comprising:
   a bus;
   a storage device connected to the bus; and
   a processing unit connected to the bus, wherein the processing unit executes a set of instructions to:
      extract a plurality of bottleneck rules from a database to analyze hotspot selections to detect the performance bottlenecks in response to receiving the hotspot selections from a user interface, wherein a hotspot is a region of source code that exceeds a time threshold to execute in the target application;
      identify a metric for each bottleneck rule in the plurality of bottleneck rules extracted from the database, wherein each identified metric is used to evaluate its associated bottleneck rule;
      identify execution order dependencies among different metrics associated with the plurality of bottleneck rules to form identified execution order dependencies among the different metrics in response to identifying a metric for each bottleneck rule in the plurality of bottleneck rules;
      build a dependency graph based on the identified execution order dependencies among the different metrics;
      partition the dependency graph based on the identified execution order dependencies among the different metrics into different levels so that no execution order dependency among the different metrics exists within a particular level of the different levels;
      identify modules associated with each of the different levels that are used to compute the different metrics;
      execute the modules associated with a level in an appropriate order one successive level after another to compute the different metrics to form computed metrics;
      determine whether each bottleneck rule is evaluated to true using the computed metrics;
      create a bottleneck description for a bottleneck rule in response to determining that the bottleneck rule is evaluated to true using an associated computed metric; and
      send the bottleneck description to the user interface.

15. A computer program product stored on a computer readable storage device having computer usable program code embodied thereon that is executable by a computer for detecting performance bottlenecks in a target application, the computer program product comprising:
   computer usable program code for extracting a plurality of bottleneck rules from a database to analyze hotspot selections to detect the performance bottlenecks in response to receiving the hotspot selections from a user interface, wherein a hotspot is a region of source code that exceeds a time threshold to execute in the target application;
   computer usable program code for identifying a metric for each bottleneck rule in the plurality of bottleneck rules extracted from the database, wherein each identified metric is used to evaluate its associated bottleneck rule;
   computer usable program code for identifying execution order dependencies among different metrics associated with the plurality of bottleneck rules to form identified execution order dependencies among the different metrics in response to identifying a metric for each bottleneck rule in the plurality of bottleneck rules;
   computer usable program code for building a dependency graph based on the identified execution order dependencies among the different metrics;
   computer usable program code for partitioning the dependency graph based on the identified execution order dependencies among the different metrics into different levels so that no execution order dependency among the different metrics exists within a particular level of the different levels;
   computer usable program code for identifying modules associated with each of the different levels that are used to compute the different metrics;
   computer usable program code for executing the modules associated with a level in an appropriate order one successive level after another to compute the different metrics to form computed metrics;
   computer usable program code for determining whether each bottleneck rule is evaluated to true using the computed metrics;
   computer usable program code for creating a bottleneck description for a bottleneck rule in response to determining that the bottleneck rule is evaluated to true using an associated computed metric; and
   computer usable program code the bottleneck description to the user interface.

16. The computer program product of claim 15, further comprising:
   computer usable program code configured to augment the target application using configuration data to form an augmented target application in response to receiving the configuration data for the target application;
   computer usable program code configured to execute the augmented target application;

computer usable program code configured to collect performance data from the augmented target application during execution to form collected performance data;

computer usable program code configured to analyze the collected performance data; and computer usable program code configured to determine source code regions within the augmented target application that are hotspots in response to analyzing the collected performance data.

17. The computer program product of claim 15, wherein the identified execution order dependencies among the different metrics determine partial ordering for module execution.

18. The computer program product of claim 17, wherein a mode of execution for a module determines partial ordering for the module execution, and wherein the mode of execution is one of an exclusive execution mode or a parallel execution mode.

* * * * *